United States Patent Office 3,029,449
Patented Apr. 17, 1962

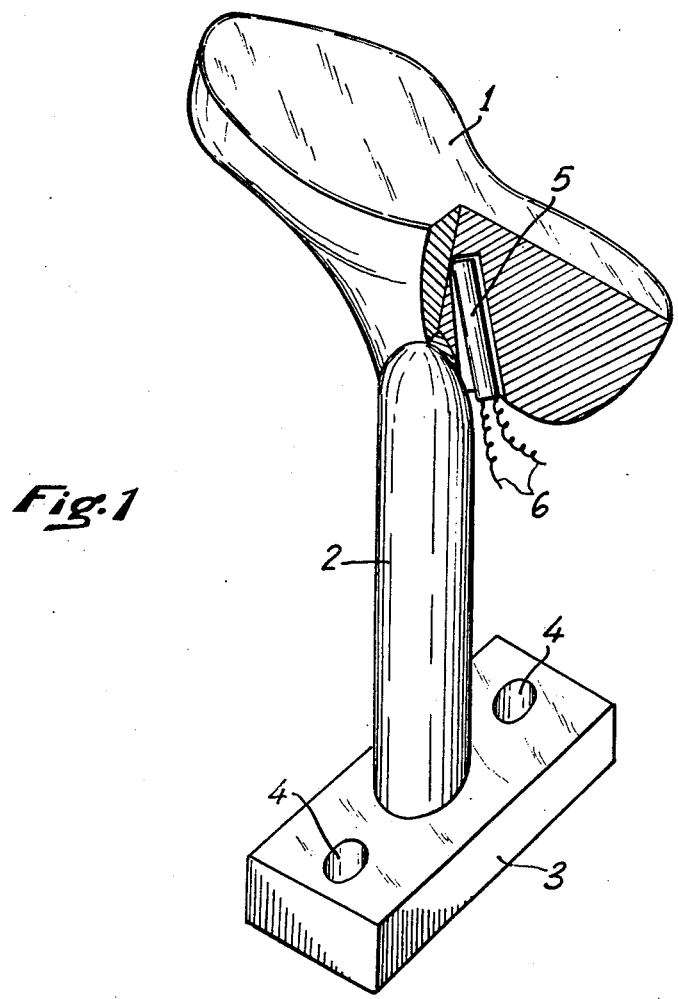

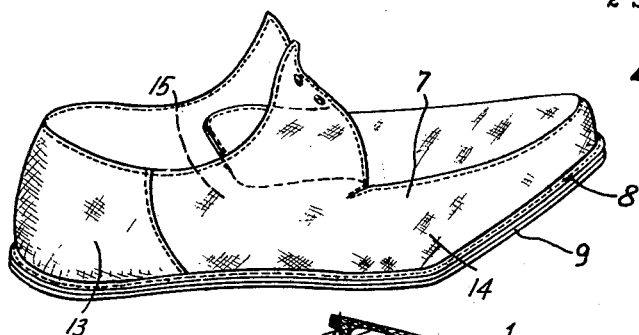
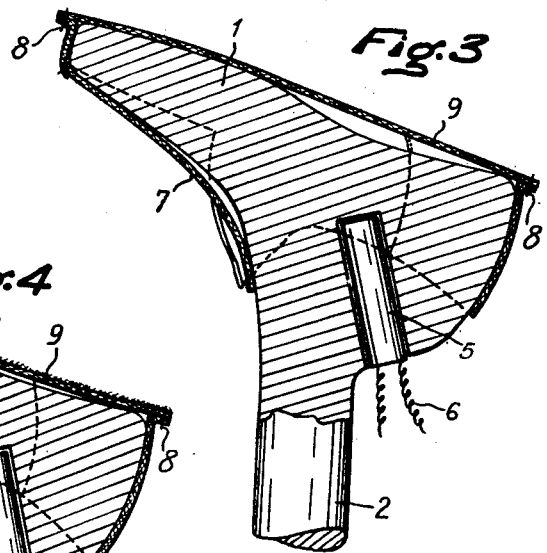
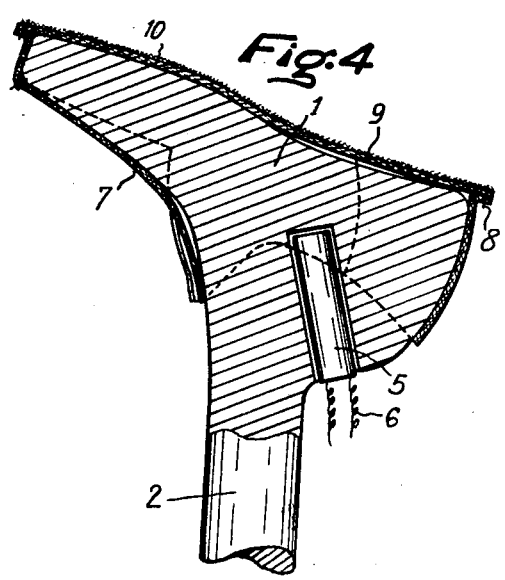
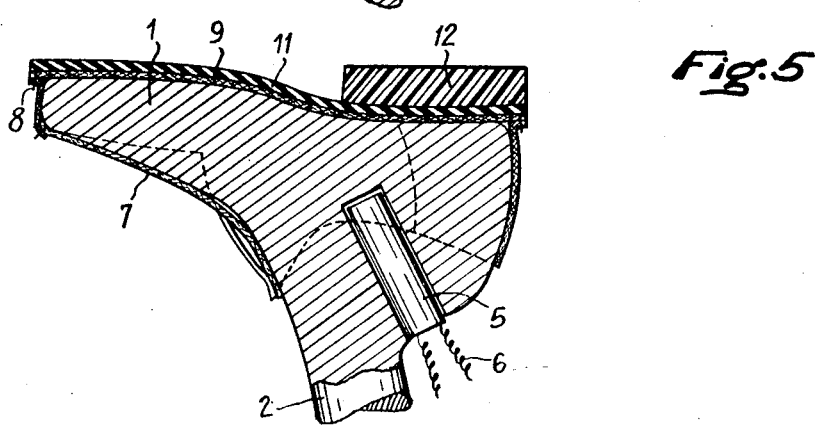

3,029,449
METHOD OF SHOE MANUFACTURE
Raoul Siron, Villeneuve-sur-Lot, France, assignor to Alpha Handels A.G., Zurich, Switzerland, a corporation of Switzerland
Filed Sept. 5, 1958, Ser. No. 759,219
Claims priority, application France Sept. 7, 1957
4 Claims. (Cl. 12—142)

Up to the present time, in all the methods of manufacturing shoes with leather made uppers, the practice has been to place the upper constituted by cut to shape pieces of leather sewed together on the last and to form it to its final shape on wooden lasts by purely mechanical methods—pulling, stretching—in order to apply the upper on the last. After this had been done, the fitting of the cut-out or prefabricated soles and heels was carried out by sewing, gluing or nailing performed on different kinds of machines.

In cases where the fitting of cut-out or prefabricated soles and heels was done by cementing, this necessitated the employment of pressure equipment developing a high pressure so as to cause the adhesive to penetrate into the insole, the liner or the upper.

The practice of heating the lasts has been followed in two special methods.

The first method has as its aim to fit on to uppers, toe-caps and heel stiffeners made of thermoplastic material. For this, it makes use of two-part, extending lasts, the end portion or portions of the last being heated so as to soften the toe, heel and counter portions sufficiently to enable them to be formed to shape. The material used does not allow for the sole and heel to be cemented and these have to be fitted at a later stage using standard methods.

The second method is concerned with the manufacture of shoes having vulcanized soles, the sole being formed in a mold on to the opening of which the upper is applied which is mounted on a heated last. This method only allows for the manufacture of shoes whose soles are fitted to the upper by hot cementing and it excludes shoes whose soles and heels are made of leather, rubber, or any other cut-out or prefabricated material.

It was also proposed to produce knitted shoe uppers of shrinkable yarn starting from a soft and pliable knitted sock which was made considerably larger in size than the size to which the same was to be shrunk. The upper after shrinkage and cooling was relasted and the heel and sole applied in the usual manner. Said method does only apply to uppers made of fabrics the synthetic yarns of which can be shrunk as much as 50%. The uppers produced are fabrics made and they are quite different of the usual common leather made uppers. It is on the contrary, an object of the present invention to provide a novel shoe-producing method that results in a shoe with a leather upper which does not distinguish, except in improved properties, over the common shoes with leather made uppers.

My invention is concerned with the manufacture of leather uppered shoes with soles and heels made of any material, cut-out or prefabricated and fitted by cementing, and it has as its aim a method which reduces the time it takes to make the shoe.

The object of my invention is a method for the manufacture of leather uppered shoes with soles and heels made of any material, cut-out or prefabricated and fitted by cementing in which the assembled shoe having a leather upper is slipped on a heated last, the external part of said assembled shoe designed to receive the outsole is coated with an adhesive, an outsole and heel are applied to the coated part and the resulting assemblage is maintained on the said last subjected to the heat therefrom to shrink the leather of the said upper and to set the adhesive. Assembled shoes may be of the type in which the upper is connected to an insole member or of the type in which the lower edges of upper are returned inside and joined together.

The last should preferably be heated to a temperature of between 100 and 140° C. Under the effect of this heating, the leather, by virtue of its natural inherent humidity, becomes flexible and workable and its shrinkage tends to apply the uncured upper automatically on the last, the leather constituting the same becoming elongated at the bulbous portions and shrunk at the hollow portions.

The shaping by the shrinkage strength due to the heating of leather avoids all the labor necessary in the old mechanical methods and the corresponding machines; the shape produced is more stable and produces a more flexible shoe than does one produced by mechanical means. The fact that, simultaneously with the shaping under heat, the adhesive has been applied to the portion destined to receive the outsole, means a considerable saving in time but, above all, it makes for a better penetration on the part of the adhesive into the pores of the insole by reason of the temperature which opens the pores and gets rid of the humidity which would otherwise adversely affect the cementing. Soles applied on a hot last are shaped uniformly by the heat and the adhesive sets quicker and better.

The equipment for implementing this method is constituted by metal lasts having heating means, preferably an electrical resistance, incorporated in the body of the last. These heated metal lasts should preferably be foundry cast in one piece and fitted in rigid sockets mounted on a rigid bench. The last and its socket may, or may not, be articulated between themselves.

If necessary, a pressure means may be provided, of any known type such as a pneumatic cushion which applies the soles and heels on to the insole while the adhesive is setting, but this appliance is not absolutely necessary in the implementation of the method, a simple hammering being sufficient for this purpose.

I will now further describe my invention with reference to the accompanying drawings in which:

FIG. 1 is a view partially in elevation and partially in section of a heated last as an example of an apparatus to perform the method of the invention;

FIG. 2 is a perspective view of the uncured assembled shoe prior to its lasting;

FIG. 3 is a sectional view of the last with the assembled shoe on it;

FIG. 4 is a sectional view corresponding to FIG. 3 with the assembled shoe during the heating step and cementing step;

FIG. 5 is a sectional view corresponding to FIG. 3, the sole and heel being cemented to the assembled shoe.

The last is constituted by a one-piece foundry casting comprising the last proper 1, carried on a brace 2 with a base plate 3 which can be bolted down, by means of bolt holes 4, on a rigid bench.

In the body of the last a recess has been provided into which is inserted an electrical resistance 5 fed by an electric conductor 6.

This method of execution is not limitative in scope and any other method of heating may be employed. It is equally possible to supplement the heated last by various components particularly pneumatic or hydraulic cushions in order to create the pressure for securing the sole. These known appliances, which do not fall within the scope of the object of my invention, will not be described in any greater detail in the ensuing remarks.

It is possible then to mount on the said heated last all kinds of leather made assembled shoes with uppers whether closed or fixed to their insoles. It is however recommended that an assembly of the type derived from the "Californian" be used. In this assembly (shown in FIG. 2), the uncured upper 7, the edge 8 of which is turned over outwards so as to form a brim enabling it to be stitched by a sewing machine, is thus sewn on to an insole 9 made of leather or some other material.

As regards the fitting of the assembled shoe, this is slipped on over the heated last, as shown in FIG. 3, using a simple shoe-horn for example. The heat shapes the leather naturally, the leather undergoing in the course of the heating, a softening followed by a shrinkage which molds the upper on the last (FIGS. 4 and 5) and stretches the leather being elongated at the bulbous portions as the heel portion 13 and external side portion 14 and shrunk at the hollow portions as the internal side portion 15.

It is quite obvious that, by virtue of the fact that a heated last is used, it is possible to put into operation the method formerly known for the shaping and fitting of toe, heel and counter portions made of thermoplastic which will have been incorporated during the stitching of the assembled shoe. The conformation of the toe, heel and counter portions is however effected not by mechanical force resulting from the extension of the last but the grip exerted by the assembled shoe as a result of the shrinkage of the leather of the upper.

The cementing of the sole is carried out on the same last. Upon the insole's having been taken to a temperature of some 70 to 100° it is coated with adhesive 10, as shown in FIG. 4, the latter penetrating easily into the pores of the part destined to receive the sole and which are expanded by the heat applied, then the outsole 11— having first been roughed up and glued—complete with its shank portion is applied together with the heel 12, as shown in FIG. 5. Because of the high temperature, favorable to the cementing, there is no point in bothering about a strong pressure. The cementing is perfect if a good adhesive is used, simply by applying it and pressing by hand or a few blows from a hammer. Nevertheless, a pressure appliance for use in conjunction with cementing may be added without departing from the framework of my invention.

The outsole and heel having been cemented on, all that is necessary is to remove the shoe, trim off and sandpaper the seam and finish it off in the finishing shop, as is the practice with other methods of manufacture.

Shoes produced in this way are particularly flexible and light and the outsole, cemented on in this manner at a high temperature, is practically untearable providing the adhesive used is of the proper kind and of good quality.

What is more, my new method of manufacture affords a considerable reduction in the cost of making the shoe, since it permits of:

(1) The total elimination of wooden lasts and the replacement of these by metal lasts of a number infinitely less (fifty to a hundred times less according to the types of production, capacity being equal), (2) The elimination of 70 to 95% of the machines and power units necessary in the types of manufacture known hitherto (depending on their complexity) for fitting the base of the shoe, (3) An equivalent reduction in the motive power employed, (4) An equivalent reduction in the labor employed in the assembly shop and the elimination of the specialization of such labor, the work being carried out by unskilled workers, (5) The total elimination of a mass of petty materials such as: thread for lacing the upper, toes, tacks, wire, staple, thread, adhesive paste, welt sewing thread, welts, cloth for binding uppers, cobbler's wax, etc., (6) A reduction in the surface area of the premises necessary for a given capacity of production, (7) A reduction in the labor at the finishing shop. Indeed, since the shoes are put through a greatly reduced cycle of manufacture, the chances and risks of their becoming soiled are correspondingly reduced and the job of cleaning them is much more rapid.

The methods of execution above described by way of example may be the subject of numerous modifications without thereby departing from the scope of my invention.

What I claim is:

1. A method of manufacturing shoes, which method comprises providing an assembled shoe having a leather upper, slipping the said assembled shoe on a heated last, coating the external part of said assembled shoe designed to receive the outsole with an adhesive, applying an outsole and heel to the coated part and maintaining the resulting assemblage on the said last subjected to the heat therefrom to shrink the leather of the said upper and to set the adhesive.

2. A method of manufacturing shoes, which method comprises providing an assembled shoe having a leather upper connected to an insole member, slipping the said assembled shoe on a heated last, coating the external face of said insole with an adhesive, applying an outsole and heel to the coated insole, and maintaining the resulting assemblage on the said last subjected to the heat therefrom to shrink the leather of the said upper and to set the adhesive.

3. A method of manufacturing shoes, which method comprises providing an assembled shoe having a leather upper connected to an insole member, slipping the said assembled shoe on a last heated to a temperature of between 100 and 140° C., having said assembled shoe heated up to a temperature of some 70 to 100° C., coating the external face of said insole with an adhesive, applying an outsole and heel to the coated insole and maintaining the resulting assemblage on the said last subjected to the heat therefrom to shrink the leather of the said upper and to set the adhesive.

4. A method of manufacturing shoes which method comprises performing in a single step shaping of the assembled parts of the shoe, cementing and drying of the out sole and heel and final setting of the shoe, the assembled parts of the shoe comprising a leather upper being slipped on a heated last, the external part of said assembled shoe designed to receive the outsole being coated with an adhesive, the outsole and heel being applied on the coated part and the whole being maintained on the heated last so as to shrink the leather of said upper and to set the adhesive.

References Cited in the file of this patent

UNITED STATES PATENTS

| 14,380 | Whorf et al. | Mar. 4, 1856 |
| 18,310 | Whorf | Sept. 29, 1857 |
| 1,928,258 | Lieberman | Sept. 26, 1933 |
| 2,087,480 | Pitman | July 20, 1937 |
| 2,098,735 | Yentis | Nov. 9, 1937 |
| 2,277,769 | McDonald | Mar. 31, 1942 |
| 2,294,481 | Ryan | Sept. 1, 1942 |
| 2,298,038 | Crandell | Oct. 6, 1942 |
| 2,302,757 | Filsinger | Nov. 24, 1942 |
| 2,318,399 | Huntoon | May 4, 1943 |
| 2,321,131 | Crandell | June 8, 1943 |
| 2,329,244 | Brandt | Sept. 14, 1943 |
| 2,641,004 | Whiting et al. | June 9, 1953 |
| 2,940,096 | Bromfield | June 14, 1960 |

FOREIGN PATENTS

| 1,124,694 | France | July 2, 1956 |